United States Patent [19]

Pomar

[11] Patent Number: 5,024,192

[45] Date of Patent: Jun. 18, 1991

[54] VARIABLE COMPRESSION RATIO INTERNAL COMBUSTION ROTATING ENGINE

[76] Inventor: Eliodoro Pomar, Apartado de Correos 366, Torremolinos, Malaga, Spain

[21] Appl. No.: 333,095

[22] Filed: Apr. 3, 1989

Related U.S. Application Data

[63] Continuation-in-part of Ser. No. 57,006, Jun. 1, 1987, abandoned.

[30] Foreign Application Priority Data

Jun. 6, 1986 [IT] Italy ............................... 20701 A/86

[51] Int. Cl.$^5$ ............................................. F02B 53/08
[52] U.S. Cl. ...................................... 123/245; 418/18; 418/37
[58] Field of Search ....................... 123/202, 239, 245; 418/18, 37

[56] References Cited

U.S. PATENT DOCUMENTS

| | | | |
|---|---|---|---|
| 1,997,233 | 4/1935 | Rodaway | 418/18 |
| 2,155,249 | 4/1939 | Bancroft | 418/37 |
| 2,413,589 | 12/1946 | Snyder | 123/245 X |
| 3,412,930 | 11/1968 | Wanner | 418/37 |
| 3,685,928 | 8/1972 | Munzinger | 418/18 |
| 3,901,034 | 8/1975 | Munzinger | 418/18 X |
| 4,311,442 | 1/1982 | Simon | 418/37 |
| 4,437,441 | 3/1984 | Menioux | 123/245 X |

FOREIGN PATENT DOCUMENTS 44311 4/1977 Japan ................................ 418/37

*Primary Examiner*—Michael Koczo
*Attorney, Agent, or Firm*—Bucknam and Archer

[57] ABSTRACT

A variable compression ratio rotating engine comprises a containing cylinder forming variable volume chambers, defined by the cylinder inner wall and piston side walls, the cross-section of which has substantially the shape of a circle sector. During the operation of the engine, the pistons are rotated with an uneven circular motion, by a mechanism including a crank, having an eccentric axis with respect to that of the containing cylinder, and small coupling rods coupling the arms of the crank and the end portions of small shafts passing through the pistons, the compression ratio being changed by means of a further mechanism able of changing the eccentricity value of the crank axis with respect to the cylinder axis.

4 Claims, 8 Drawing Sheets

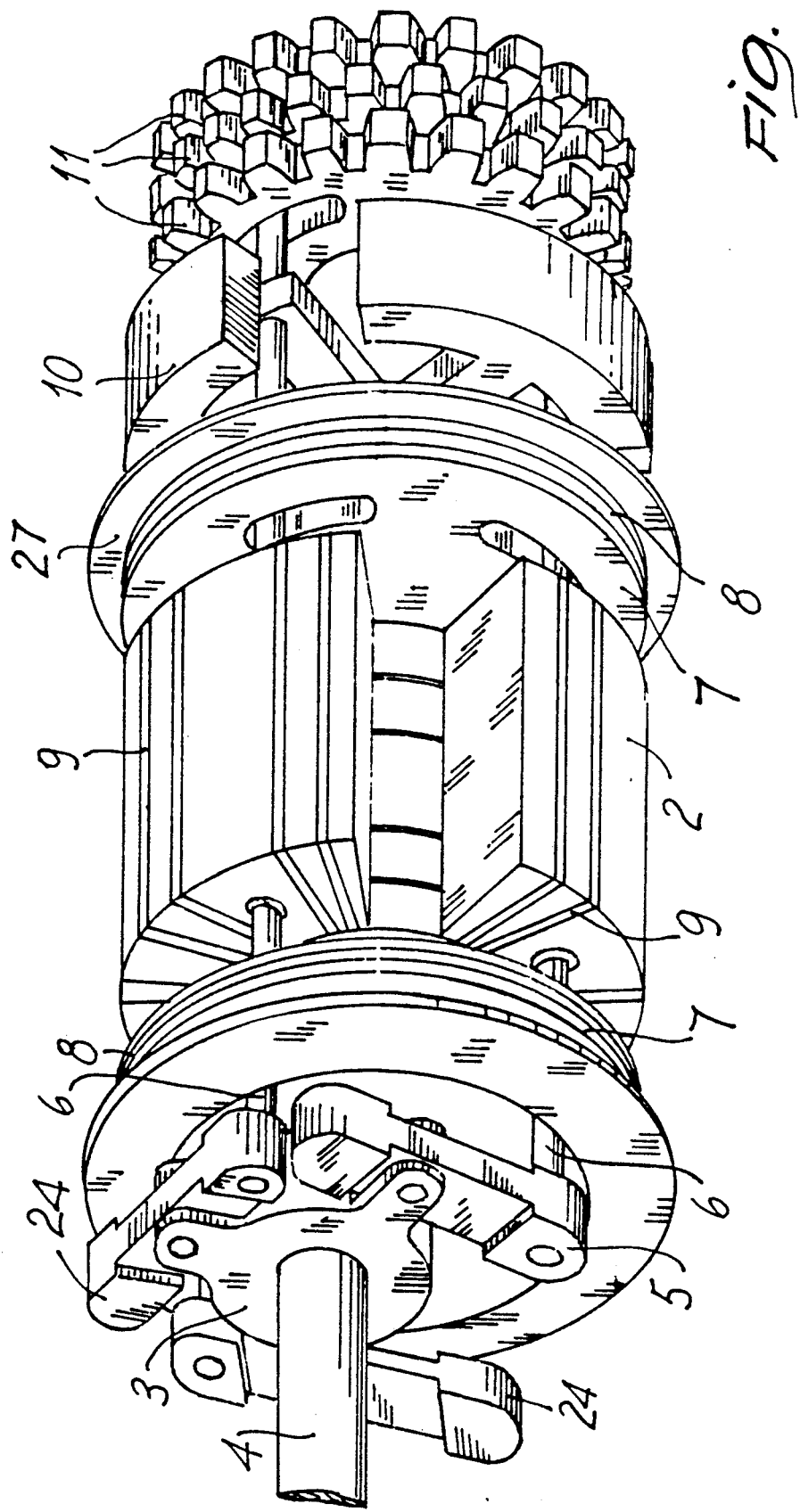

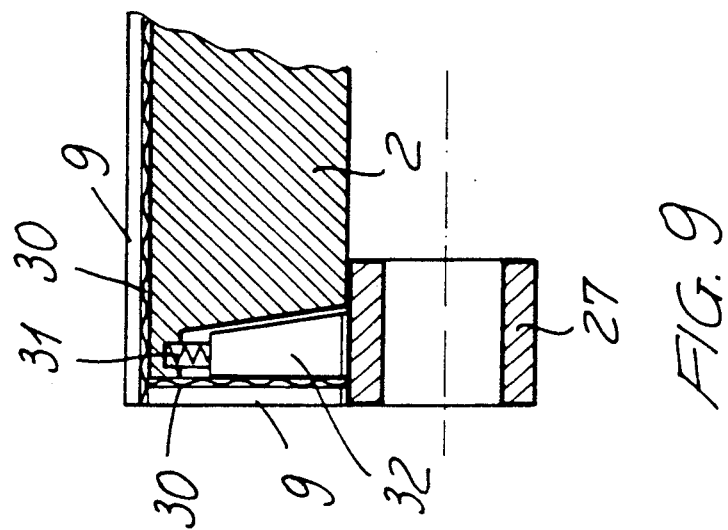
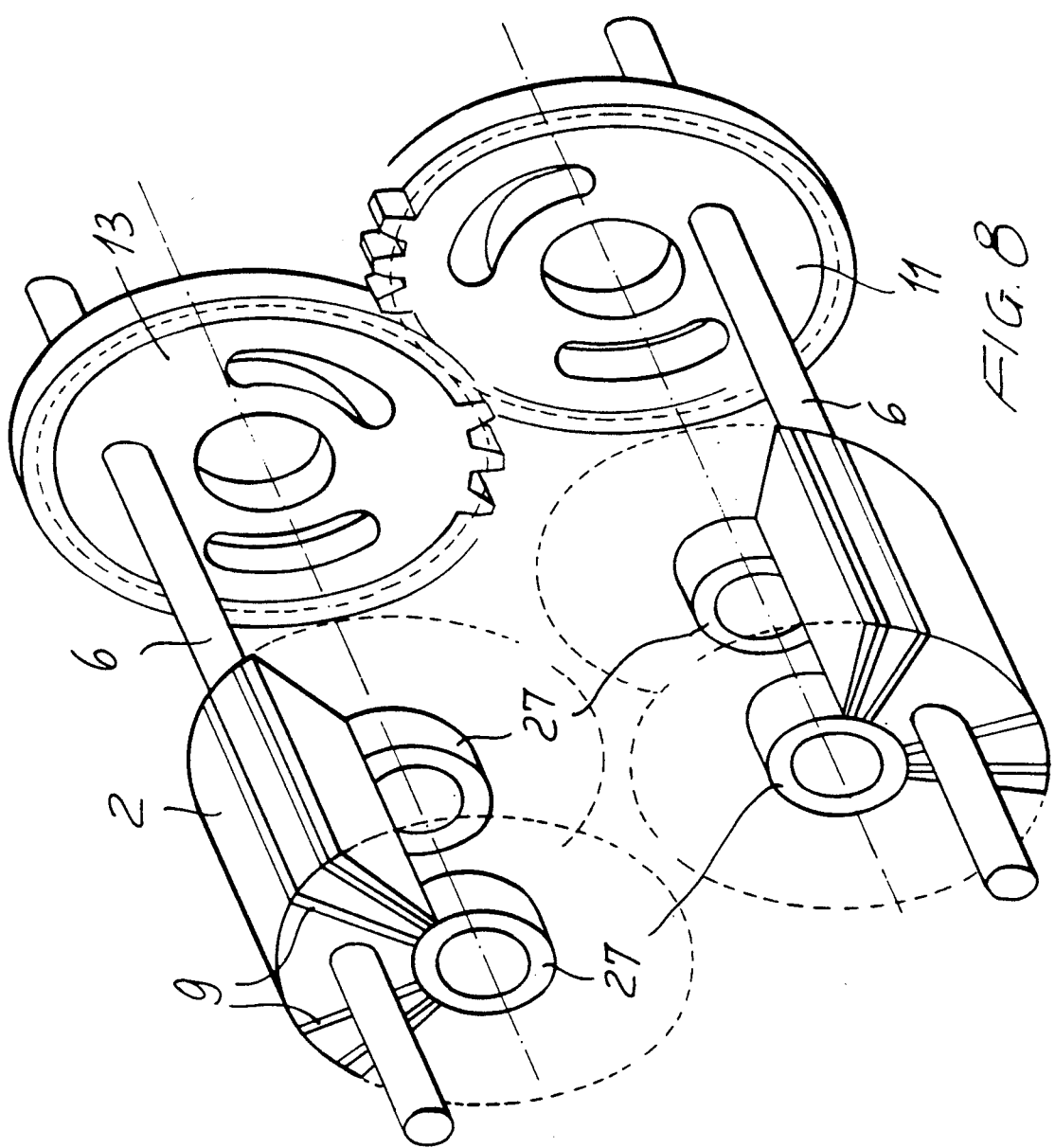

VARIABLE COMPRESSION RATIO INTERNAL COMBUSTION ROTATING ENGINE

BACKGROUND OF THE INVENTION

This is a continuation-in-part of U.S. application Ser. No. 057,006 filed on June 1, 1987, in the name of the same applicant, now abandoned.

The present invention relates to a rotating internal combustion engine provided with means for varying the compression ratio.

As is known, there are presently available the so-called Wankel type rotary engines which, however, have great drawbacks with respect to the gas tightness and do not afford the possibility of affecting, by modifying the variable volume chamber shape, the combustion conditions of the air/fuel mixture, depending on its turbulence and the formation of a proper flame front.

Moreover, these Wankel engines do not achieve very high compression ratio and they do not fully exploit the gas expansion force, because of the poor radial extension of the surface affected by the gas active pressure.

There are also known further rotary engines such as that disclosed in the U.S. Pat. No. 3,685,928 granted on Aug. 22, 1972 to Munzinger. More specifically this patent discloses a rotary piston engine, including a plurality of cylinder forming annular elements and a plurality of annular segment piston pairs, the segment piston of each pair moving inside one of said cylinders and having disc shaped articulated elements bearing against each other and defining together with their circumferenatial surfaces the inner wall of the corresponding cylinder, the hubs of one of the segment pistons of each pair having shaft portions axially extending therefrom and forming outer hollow shaft means and the hubs of the other pistons of each pair having shaft portions extending axially therefrom which form inner shaft means, the shaft portions of the inner shaft means being supported within the shaft portions of the outer shaft means, separating elements between each pair of piston segments forming the end walls of the cylinder, a common shaft, means operatively coupling the outer shaft means and inner shaft means to the common shaft, the hubs of the inner shaft means being provided with annular recesses therethrough at the same spacing from the axis of the shaft means as the distance separating the shaft walls of the outer shaft means, the shaft portions of the outer shaft means having axial projections on a side thereof extending through and with a circumferential size less than that of said annular recesses, the shaft portions of the outer shaft means having recesses therein on the opposite side from said annular recesses, the projection of one of the outer shaft means extending through said separating means and engaging in the recess of the subsequent shaft means, the shaft portions of the inner shaft means having means engageable thereon by an axial displacement thereof in order to connect them for jointly rotating.

In this patent the two pistons operating in each cylinder rotate with a cyclically variable speed: however, as clearly stated in claim 2 of this patent, the single pistons operating in different cylinders are coupled on the same axis with such an angular displacement that each piston has, with respect to the adjacent piston of the adjacent cylinder, an angle equal to the ratio of 360° and the number of the cylinders of the engine.

Accordingly, this mechanical arrangement provides a maximum compression condition in the several engine cylinders for mutually fixed angular positions.

This construction has been selected by Mutzinger in order to obtain an equilibrium condition of the main rotating masses of the engine.

On the other hand, such a mechanical construction constrains the size of gas ducts and provide said ducts with two elbows each, since the engine cylinders are arranged along the same axis.

Thus, the main object of the present invention is to overcome the above mentioned drawbacks of known rotary internal combustion engines, by providing such a rotary engine in which all of the component parts are perfectly balanced, both from the static and from the dynamic standpoint, with a very simple mechanical construction.

Another object of the present invention is to provide such a rotary engine the pistons of which are so arranged and balanced as to locate the maximum compression angular position of the cylinders at a zone adapted to greatly reduce the gas duct length.

Another object of the present invention is to provide such a rotary engine including means for homologously coupling the engine pistons so as to provide an identical movement pattern for the coupled pistons and identical variations of the movement pattern as the engine compression ratio is changed.

Another object of the present invention is to provide such a rotary engine which has a high power jointly with a very even torque, both owing to the possibility of obtaining a greater number of complete operating cycles for each revolution of the driving shaft and a high rotation speed as a consequence of a complete elimination of the engine reciprocating masses.

Another object of the present invention is to provide such a rotary engine which does not comprise valve means, which would be not compatible with high revolution speeds, and in which the gas passage ports can be constructed with a comparatively large size.

Another object of the present invention is to provide such a rotary engine having a compression and scavenging ratio much larger than that of a conventional two-stroke engine with a complete independence of the angular duration of the respective phases of the operating cycle, which has been obtained, according to the invention, by using two identical mechanisms held in separated and adjoining cylinders, in which one of these mechanism operates to suck and compress the fresh mixture, while the other mechanism operates as a combustion-expansion mechanism, this mechanical arrangement affording a great reduction of the dead spaces of the gas ports, a complete elimination of the fresh mixture loss, since the scavenging is performed by not carburetted air, and an increase of the burnt gas expansion phase.

Another object of the present invention is to provide such a rotary engine which can operate with different types of fuels, by instantaneously adapting the compression ratio to the characteristics of the selected fuel, thereby practically providing an effective multiple-fuel engine.

Another object of the present invention is to provide such a rotary engine with a very reduced atmospheric pollution, owing to the possibility of fitting the compression ratio to the load of the engine, mainly for low revolution speeds.

SUMMARY OF THE INVENTION

According to one aspect of the present invention the above mentioned objects, as well as yet other objects, which will become more apparent hereinafter, are achieved by a variable compression ratio internal combustion engine comprising at least two cylinders defining variable volume chambers encompassed by the inner wall of the respective cylinder and the side walls of the pistons the cross-section of which, according to a plane perpendicular to the main axis of the cylinder, has substantially the shape of a circular sector or segment.

The engine pistons, in particular, are rotated with an uneven circular motion by a mechanism including a crank, having an eccentric axis with respect to that of the cylinder, and by coupling rods coupling the crank arms and the end portions of small shafts passing through the pistons, means being moreover provided for varying the compression ratio and operating on the variation of the eccentricity of the crank axis with respect to the cylinder axis.

BRIEF DESCRIPTION OF THE DRAWINGS

Further characteristics and advantages of the invention will become more apparent from the following detailed description of a preferred, though not exclusive, embodiment of a variable compression ratio internal combustion engine, which is illustrated, by way of an indicative but not limitative example, in the figures of the accompanying drawings, where:

FIG. 7 is an axonometric view illustrating, in exploded form, the inner rotary portion of a cylinder of the engine;

FIG. 8 is a further axonometric view illustrating a diagram of the system for coupling each single piston of the suction-compressing cylinder to the corresponding or homologous piston of the combustion-expanding cylinder; and FIG. 9 shows the cross-section shape of a piston, in which there are clearly illustrated the resilient piston rings.

DESCRIPTION OF THE PREFERRED EMBODIMENT

Figure 1:
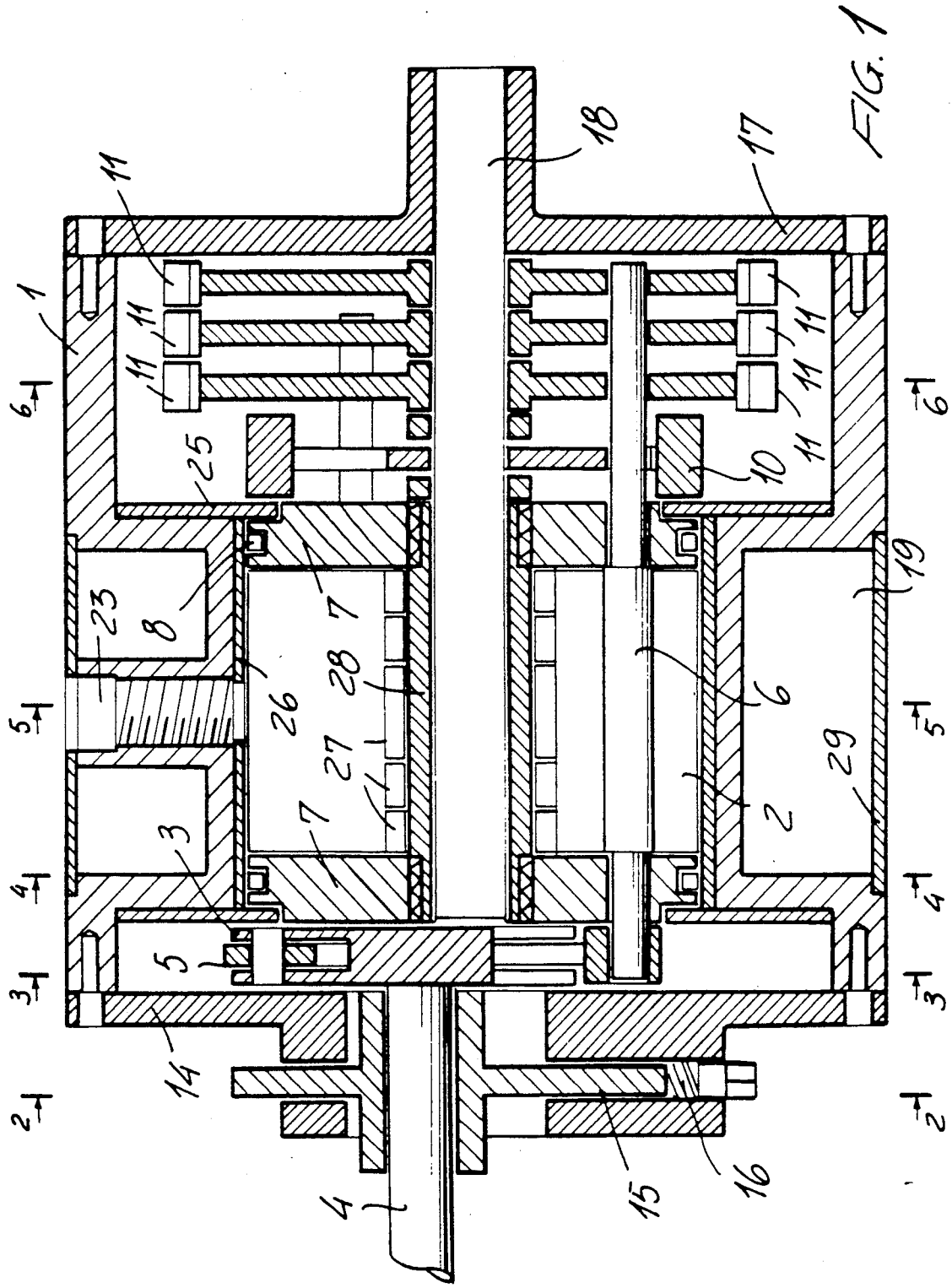
FIG. 1 is a longitudinal cross-sectional view of an engine cylinder, taken along the section line A-B shown in the following FIGS. 2,3,4,5 and 6.
Figure 2:
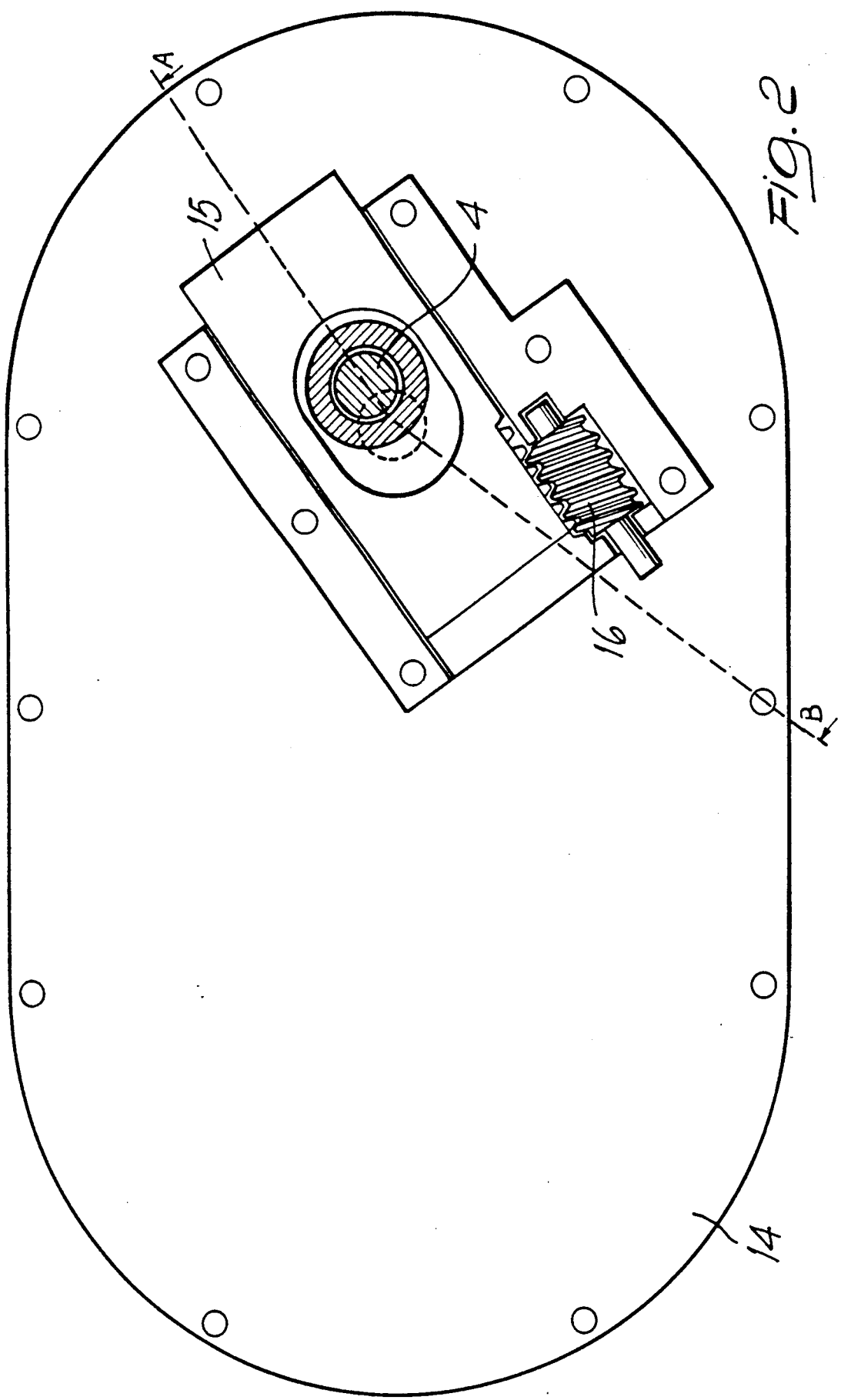
FIG. 2 is a cross-sectional view taken along the line 2—2 of FIG. 1 and illustrating, by way of an example, a mechanism effective to change, simultaneously and in the same way, the compression ratio of all of the chambers of the engine and those of the pre-compressor coupled thereto.
Figure 3:
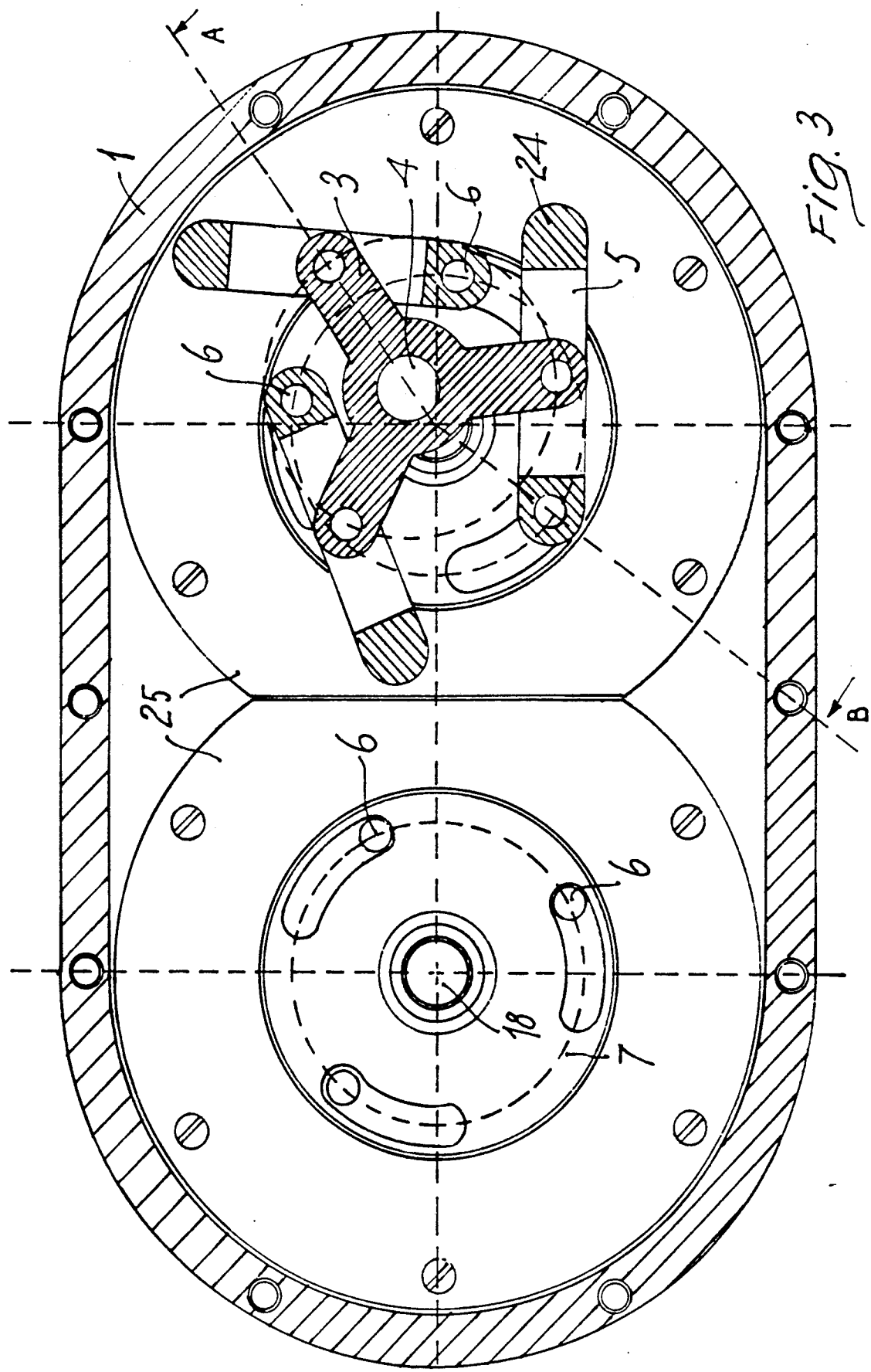
FIG. 3 is another cross-sectional view, taken along the line 3—3 of FIG. 1, at the crank and coupling rods forming the mechanism provided for cyclically changing the piston rotation or turning speed.
Figure 4:
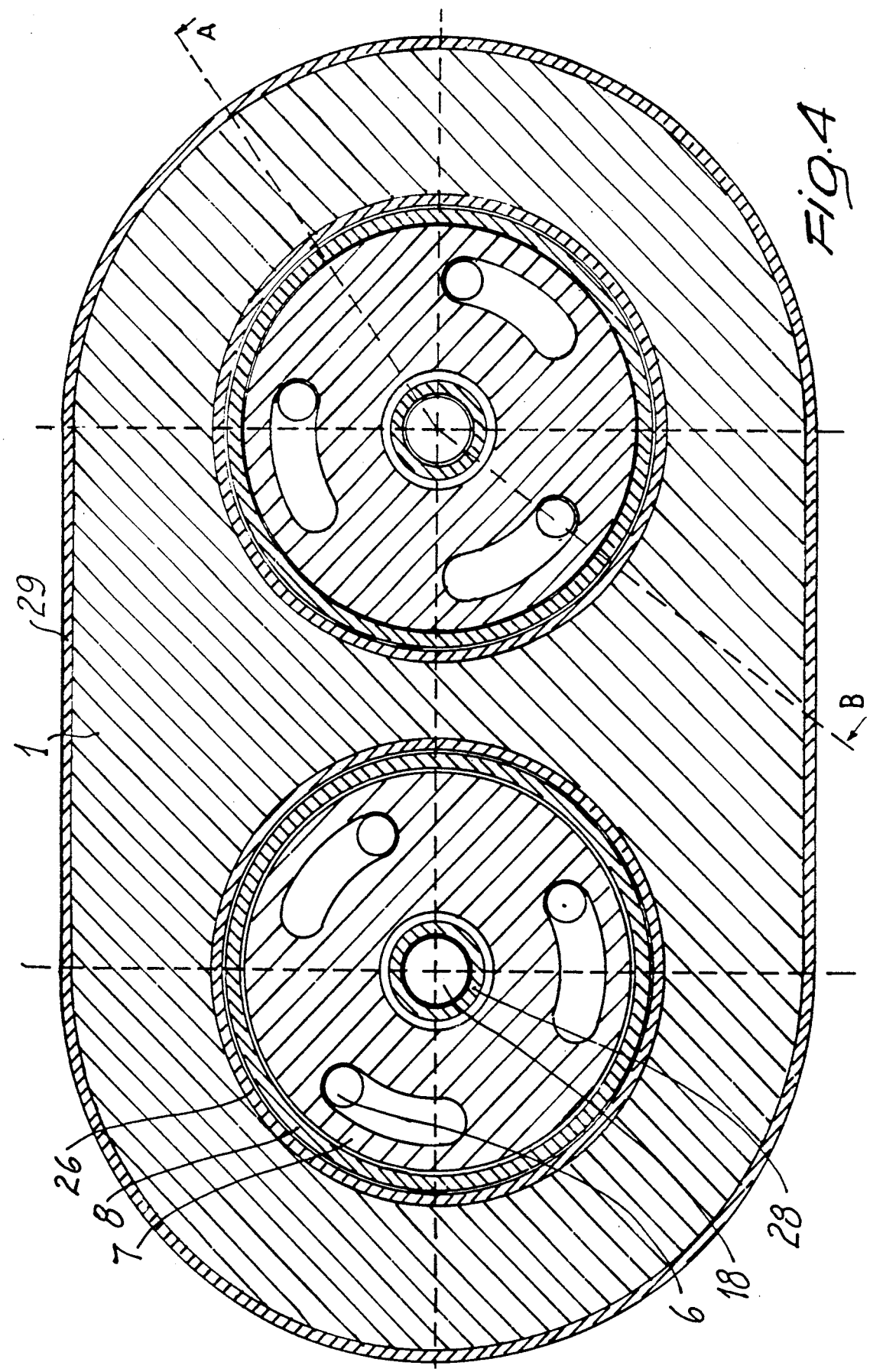
FIG. 4 is another cross-sectional view taken along the line 4—4 of FIG. 1, and specifically illustrates the tightness front discs both of the engine cylinder and of the precompressor cylinder.
Figure 5:
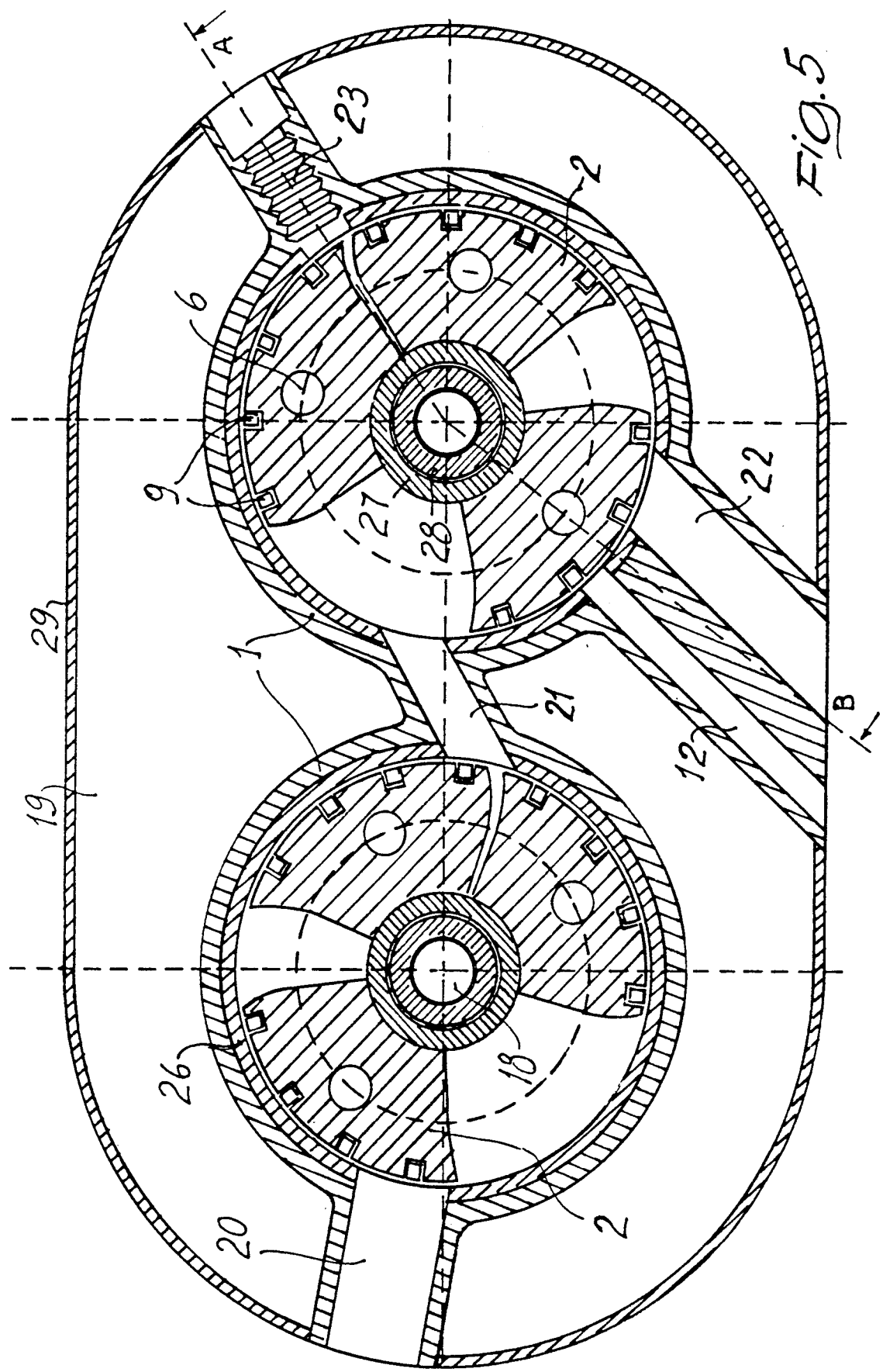
FIG. 5 is another cross-sectional view, taken along the line 5—5 of FIG. 1, and illustrating the cross-section shapes and mutual positions of the engine and precompressor pistons.
Figure 6:
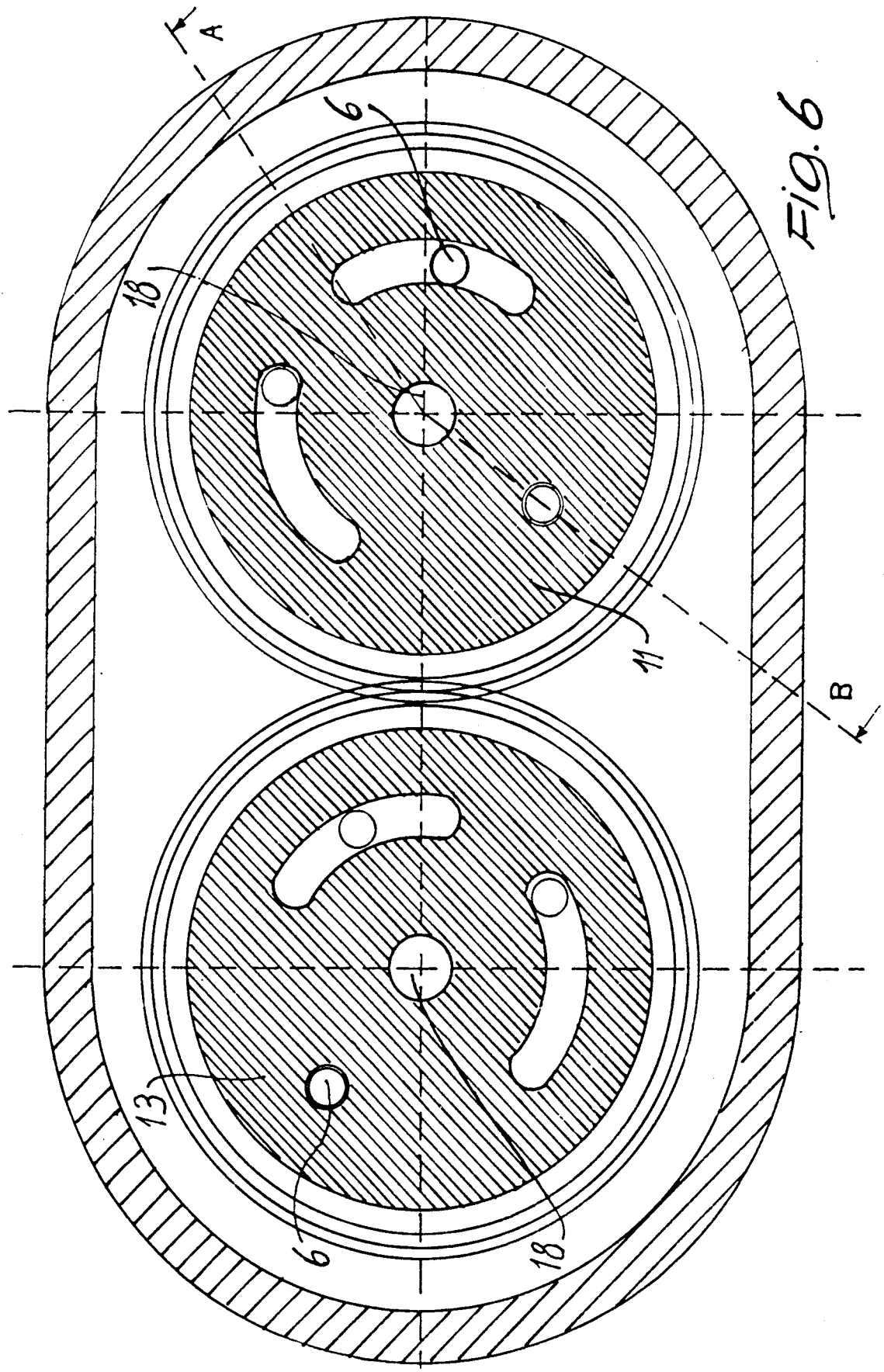
FIG. 6 is another cross-sectional view taken along the line 6—6 of FIG. 1, at the gears provided for mechanically coupling the engine pistons to the precompressor pistons, in order to assure a proper mutual position of said pistons.

With reference to the figures of the accompanying drawings, the variable compression ratio internal combustion engine according to the present invention comprises at least two cylinders, more specifically an engine cylinder proper and a compressor cylinder, which are provided with a liner 26 in which there are arranged the pistons 2 coaxially rotating therein.

As shown, the cylinders and pistons define a plurality of variable volume chambers.

More specifically, these chambers are encompassed by a portion of the inner walls of the respective cylinders and by the side walls of the pistons.

The pistons 2, in particular, have, according to a cross-section taken perpendicularly to the axis of the cylinders 1, a substantially circular sector shape.

Advantageously, according to one aspect of the invention, the radial surfaces of the pistons defining said chambers can be specifically designed, in a conjugate manner, so as to improve the combustion conditions inside the chambers, in order to reduce the inlet loss at the gas ports, which will be described in a more detailed way hereinafter.

In particular, through the cylinder 1 there are formed the inlet port 20, the transfer port 21 and the outlet port 22 and scavenging port 12, there being moreover provided a housing for receiving the sparking plug 23 and-/or the fuel injector member.

As shown, the gas transfer port 21 has, owing to the adjoining arrangement of the cylinders, a great cross-section adapted to provide small gas speeds and accordingly a very reduced loss even for high revolution speeds of the engine, with a very short length to reduce to a minimum the dead volume.

Inside the cylinder 1 there are arranged a plurality of pistons 2 including, for each cylinder, at least two units; in the accompanying drawings there being illustrated three pistons, each of which rotates about a central shaft and is coupled thereto through ring members 27.

With the driving shaft 4 there is rigid a crank 3, able of rotating about an axis which is eccentric with respect to the axis of the cylinder.

The engine further comprises suitable sealing members, consisting of discs 7 which are coupled to one another by means of a hollow shaft 28, circular rings 8 and rectangular cross-section ring members 9, as well as further rings 25.

Each piston is coupled, through the sealing members, to a respective counterweight 10 which operates to statically and dynamically balance the piston itself.

The pistons of the engine cylinder and those of the precompressor cylinder are coupled to one another by means of suitable kinematic members which, for example, comprise driving gears 11 and driven gears 13.

Furthermore there is provided a mechanism for varying the compression ratio, which mechanism is supported by a front plug member 14, and can advantageously comprise a rack 15-worm screw 16 assembly.

At the rear, there is provided a plug member 17 rigid with a centering shaft 18. It should be pointed out in this connection that from the drawings there have been omitted the lubricating system ducts, since they are not necessary for understanding the operation of the assembly. With respect to the cooling system there is exclusively represented the gap 19 included between the cylinder 1 and outer liner 29, in which a cooling fluid would be able to circulate.

The rotary internal combustion engine according to the present invention operates with the following phases or strokes: after the combustion phase, in the chamber having the minimum volume configuration and with a suitable spark advance, the pistons 2 are caused to rotate. This rotation is transmitted by said pistons, through the small shafts 6, from one side, to the coupling rods 5 (each balanced by an end balancing counterweight 24) and hence to the crank 3 and driving shaft 4 and, from the other side, to the members provided for transmitting motion or driving the pistons of the precompressor, for example through the gears 11 and 13.

This rotary movement occurs about the centering shaft 18, which is coaxial with the cylinder.

Thus the small shafts 6 are caused to move along different length circumference arcs, in equal times during a full revolution of each piston: because of this reason, the pistons, as they rotate, will move to one another and away from one another alternatively, thereby causing the volume of the chambers encompassed by the radial walls of the pistons and inner wall of the holding cylinder to vary.

This volume variation will depend on the eccentricity of the driving shaft with respect to the axis of the cylinder; accordingly it will be sufficient to vary said eccentricity in order to change the compression ratio, theoretically from 0 to infinite.

In actual practice, this ratio may be changed within sufficiently broad limits to afford the possibility of fitting the characteristics of the subject engine to all of the possible requirements of the operation of any internal combustion engines.

According to a further characteristic of the present invention the two pluralities of pistons (engine pistons and precompressor pistons) have preferably opposite turning directions, in order to completely suppress possible vibrations at high revolution speeds, each piston of the cylinder in which there is carried out the combustion being kinematically coupled to the corresponding or homologous piston of the cylinder in which there is carried out the suction or intake step so as to immediately and identically transmit any movement variation.

In the drawings there has been illustrated, by way of an indicative but not limitative example, one of the several possible mechanical approaches to vary the compression ratio, even as the engine is operating.

More specifically, the complete operating cycle number, for each revolution of the driving shaft, will be equal to the number of the chambers and hence of the related pistons; thus, in the exemplary embodiment shown in the drawings, the cycles will be three for each revolution of the driving shaft.

Tightness or sealing of the engine parts, which are always slidingly contacted on extended surfaces, is assured by suitable labyrinths formed by resilient rings of any suitable types: those of rectangular cross-section shape 9 are held in contact against the surface thereon they must slide by means of springs 30 effective to cause said rectangular cross-section parts to abut on said surface even if the engine is in a stop condition, whereas, as the engine operates, they will be pushed further into contact because of the centrifugal force actine thereon.

The device which permits to achieve this condition also for the rings or bands arranged on the front flat surfaces of the pistons is schematically shown in FIG. 9 and consists of a metal mass 32 pressed in the direction of the central axis by the spring 31 which is pressed as the engine operates by the centrifugal force acting on the mass 32 which will push outwardly the corresponding ring member 9.

From the above disclosure it should be apparent that the present invention fully achieves the intended objects.

In particular, the variable compression ratio rotary internal combustion engine according to the invention has been specifically designed to afford a high rotary speed operation.

Accordingly, a great effort has been made in perfectly balancing the rotating masses, which problem has been satisfactorily solved by causing the pistons in the two cylinders to rotate in opposite directions, after having removed, because of constructional reasons, the originally provided counterweights.

A like effort has been made to properly study the gas dynamic flows, with a consequent increase of the gas port cross-sections and a rational arrangement of these ports, with the cylinders arranged adjoining one another.

These two obtained conditions, together with the fact that there are performed three complete cycles for each revolution of the driving shaft, which means that in each time of the engine operation there occurs an active expansion of the burnt gases, allow for the subject engine to achieve very high specific power values, with respect to those obtained with conventional piston engines, with a very reduced fuel consume.

The shape of the surfaces of the pistons which define the two movable surfaces of the combustion chamber can be broadly changed, provided that there are selected mutually conjugate surfaces in order to improve the gas flow, turbulence and flame front pattern to improve in turn the combustion conditions and decrease the inlet loss at the gas ports.

In actual practice the sole limitation to the performance of the engine according to the present invention derives from the efficiency of the cooling system which can be improved by using a ceramics material for the strongly thermally stressed engine parts, such as the pistons.

While the invention has been disclosed and illustrated with reference to a preferred embodiment thereof, it should be apparent that the disclosed embodiment is susceptible to several modifications and variations, all of which will come within the spirit and scope of the appended claims.

I claim:

1. A variable compression ratio internal combustion engine comprising first and second separated adjoining cylinders and first and second pluralities of pistons rotatably housed in each said first and second cylinders, said first and second cylinders defining a plurality of variable volume chambers defined by a portion of inner walls of said first and second cylinders and by side walls of said pistons, said pistons having a substantially circular sector shape cross-section, each said piston rotating within each said cylinder with an uneven circular motion, a mechanism for rotating each said piston, said mechanism including a crank having a plurality of arms and an eccentric axis with respect to the axis of each said cylinder, and coupling rods between the arms of the crank and end portions of shaft members passing through said pistons, there being moreover provided means for changing the compression ratio of said engine, said means operating by changing the eccentricity of the axis of said crank with respect to the cylinder axis, said plurality of chambers comprising a first series of chambers associated with said first cylinder and a second series of chambers associated with said second cylinder, said first cylinder having intake port means for supplying an air-fuel mixture to said first series of chambers for compressing by said first plurality of pistons in said first series of chambers said air-fuel mixture, and transfer port means communicating said first cylinder with said second cylinder, said second cylinder having exhaust port means and scavenging port means for carrying out by said second plurality of pistons in said second series of chambers a further compression of said air-fuel mixture, a combustion thereof and an exhaust and scavenging of burnt gases from said second series of chambers.

2. An engine according to claim 1, wherein each of said rotating pistons rotates about a central fixed shaft and is coupled to said central fixed shaft by means of annular elements, said rotating pistons defining with said cylinders said plurality of said variable volume chambers, said plurality of said chambers defining two series of like separated chambers, said chambers being formed between inner surfaces of said cylinders and radial portions of said pistons rotating about said cylinder axis, said pistons being rigidly coupled to said shaft members in turn coupled, through said rods, to said crank, said shaft members being restrained to move on different length circumferential paths so as to assume different angular speeds.

3. An engine according to claim 1, wherein said first and second pluralities of pistons rotate in opposite directions, each piston of said second cylinder being coupled to a corresponding piston of said first cylinder.

4. An engine according to claim 1, wherein said side walls of said pistons have conjugate surfaces defining said variable chambers, said engine further comprising a sealing labirinth system including rectangular cross-section ring members housed in grooves in said pistons and spring members pressing said ring members against each cylinder.

* * * * *